(12) United States Patent
Schmelzle et al.

(10) Patent No.: US 10,035,092 B2
(45) Date of Patent: Jul. 31, 2018

(54) HOUSING, HOUSING COVER AND CONNECTING PART OF A DEVICE FOR SEPARATING AT LEAST ONE FLUID FROM A GAS AND A DEVICE FOR THE SEPARATION OF A FLUID

(71) Applicant: MANN+HUMMEL GMBH, Ludwigsburg (DE)

(72) Inventors: Janine Schmelzle, Karlsruhe (DE); Klemens Dworatzek, Edingen (DE); Bertram Bartelt, Steinheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 98 days.

(21) Appl. No.: 14/817,358

(22) Filed: Aug. 4, 2015

(65) Prior Publication Data

US 2016/0030870 A1 Feb. 4, 2016
US 2017/0296957 A9 Oct. 19, 2017

Related U.S. Application Data

(63) Continuation-in-part of application No. 14/172,202, filed on Feb. 4, 2014, now Pat. No. 9,248,393.

(30) Foreign Application Priority Data

Feb. 4, 2013 (DE) .................. 10 2013 001 842
Aug. 1, 2014 (DE) .................. 10 2014 011 303

(51) Int. Cl.
*B01D 46/00* (2006.01)
*B01D 46/24* (2006.01)

(52) U.S. Cl.
CPC ..... *B01D 46/0002* (2013.01); *B01D 46/0015* (2013.01); *B01D 46/0031* (2013.01);
(Continued)

(58) Field of Classification Search
CPC ............ B01D 46/0002; B01D 46/0031; B01D 46/24; B01D 46/2411; B01D 46/0015; B01D 2271/022; B01D 2271/027
See application file for complete search history.

(56) References Cited

U.S. PATENT DOCUMENTS

| 4,632,682 A | 12/1986 | Erdmannsdorfer |
| 2010/0000412 A1* | 1/2010 | Heikamp ............ B01D 46/003 96/189 |

(Continued)

*Primary Examiner* — Robert Clemente
(74) *Attorney, Agent, or Firm* — James Hasselbeck

(57) ABSTRACT

Described is a housing (18) for a separating device (12) for separating fluid from a gas, a housing cover (28) and a connecting part (16) of a device (12) and a device (12) for separating a fluid. The housing (18) has at least one first gas passage (82), which is centrally disposed relative to an axis (30) on a connection device (14). The housing (18) has at least one second gas passage (52), which is disposed radially outside the at least one first gas passage (82) with respect to the axis (30). The housing (18) has at least one fluid outlet (36, 48, 64) for fluid separated from the gas, which is disposed radially between the at least one first gas passage (82) and the at least one second gas passage (52) with respect to the axis (30). Between the at least one second gas passage (52) and the at least one fluid outlet (36, 48, 64), at least one housing-side fluid outlet sealing part (66) of at least one fluid outlet sealing device (92) is disposed, which is configured to sealingly interact with at least one corresponding connection-side fluid outlet sealing part (68) of the connecting part (16), which is provided for connecting the housing (18) with the connection device (14).

9 Claims, 9 Drawing Sheets

(52) U.S. Cl.
CPC .... *B01D 46/2411* (2013.01); *B01D 2271/022* (2013.01); *B01D 2271/027* (2013.01)

(56) References Cited

U.S. PATENT DOCUMENTS

2012/0144789 A1\* 6/2012 Schnacke ........... B01D 46/0024
 55/482
2015/0101293 A1 4/2015 Dworatzek et al.

\* cited by examiner

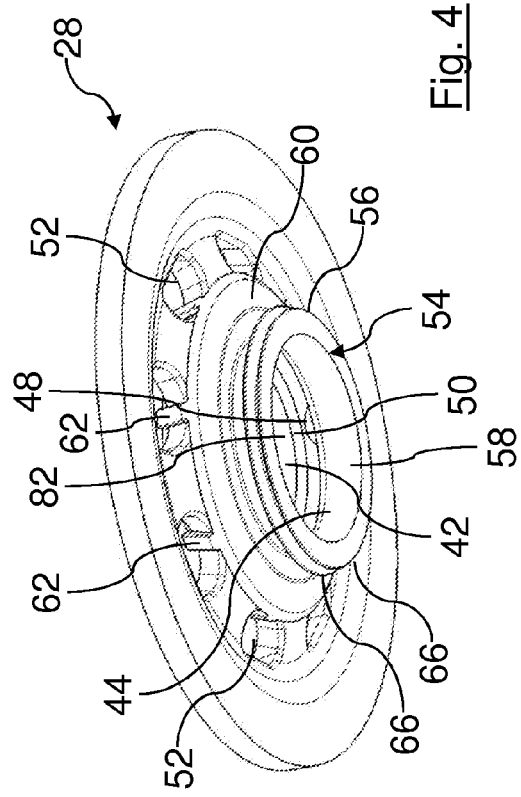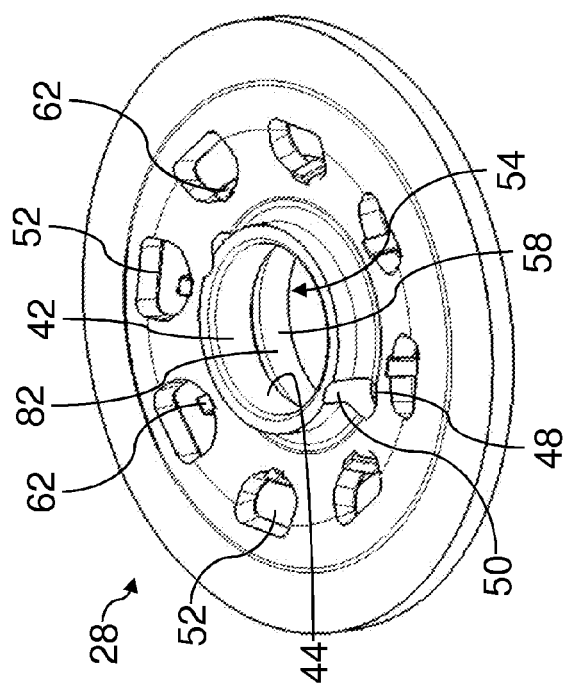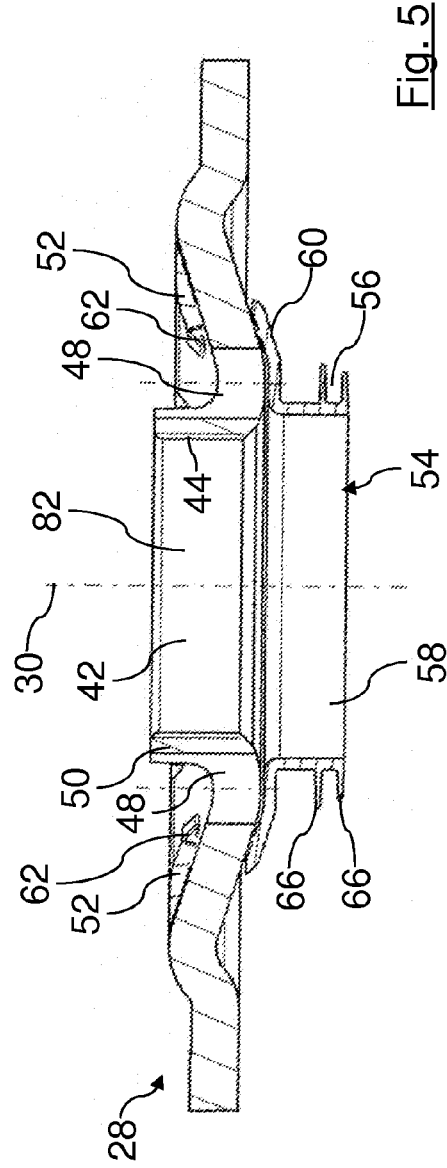

HOUSING, HOUSING COVER AND CONNECTING PART OF A DEVICE FOR SEPARATING AT LEAST ONE FLUID FROM A GAS AND A DEVICE FOR THE SEPARATION OF A FLUID

TECHNICAL FIELD

The invention relates to a housing of a device for separating at least one fluid, in particular oil, from a gas, in particular air, in particular an air/oil separator box or an air/oil separator element, in particular of a compressor, a compressed air system or a vacuum pump, having at least one first gas passage which, with respect to an axis, in particular an assembly axis, of the housing is centrally, in particular coaxially, disposed on a connecting device, having at least one second gas passage which, with respect to the axis, is disposed radially outward from the at least one first gas passage, and having at least one fluid outlet for fluid separated from the gas, which is disposed with regard to the axis radially between the at least one first gas passage and the at least one second gas passage.

The invention further relates to a housing cover of a housing of a device for separating at least one fluid, in particular oil, from a gas, in particular air, in particular an air/oil separator box or an air/oil separator element, in particular of a compressor, a compressed air system or a vacuum pump, having at least one first gas passage which, with respect to an axis, in particular an assembly axis, of the housing is centrally, in particular coaxially, disposed on a connecting device, having at least one second gas passage which, with respect to the axis, is disposed radially outward from the at least one first gas passage, and having at least one fluid outlet for fluid separated from the gas, which is disposed with regard to the axis radially between the at least one first gas passage and the at least one second gas passage.

The invention also relates to a connecting part, in particular a connection nipple or connection tube fitting for connecting a device for separating at least one fluid, in particular oil, from a gas, in particular air, in particular an air/oil separator box or an air/oil separator element, in particular of a compressor, a compressed air system or a vacuum pump, with a connection device having at least one gas-conducting space, particularly an inner space, for at least one first gas passage of a housing of the device.

The invention finally relates to a device for separating at least one fluid, in particular oil, from a gas, in particular air, in particular an air/oil separator box or an air/oil separator element, in particular of a compressor, a compressed air system or a vacuum pump, having at least one first gas passage which, with respect to an axis, in particular an assembly axis, of the housing is centrally, in particular coaxially, disposed on a connecting device, having at least one second gas passage which, with respect to the axis, is disposed radially outward from the at least one first gas passage, and having at least one fluid outlet for fluid separated from the gas, which is disposed with regard to the axis radially between the at least one first gas passage and the at least one second gas passage.

BACKGROUND

An apparatus for separating oil droplets from air with a separator head is known from DE 8501736 U1. The separator head has an eccentrically disposed inflow channel for the raw air and a central outflow channel for the clean air. A housing cover closes a housing on a lower end side. The housing cover has a central threaded hole to be screwed onto a threaded pipe stub firmly fixed on the separator head. The housing cover further has a concentric sealing ring outside the threaded hole for sealed engagement with the separator head. The housing cover is provided with inflow openings at the inflow channel in the region between the threaded hole and the sealing ring. An annular gap connected to a separate outflow channel serves to discharge the separated oil.

SUMMARY OF THE INVENTION

The object of the invention is to design a housing, a housing cover, a connecting part and a device of the aforementioned type, in which a leakproofness of connections of at least one gas passage and/or at least one fluid outlet, in particular a liquid outlet of the housing, with the connection device and/or the connecting part, can be improved. In particular, any tolerances, in particular component-related and/or assembly-related tolerances, can be better compensated.

This object is achieved with the housing according to the invention in that between the at least one second gas passage and the at least one fluid outlet is disposed at least one housing-side fluid outlet sealing device, which can sealingly interact with at least one corresponding connection-side fluid outlet sealing part or a connecting part, which is provided for connecting the housing with the connection device.

According to the invention, disposed between the at least one second, outer gas passage and the at least one fluid outlet is at least one housing-side fluid outlet sealing part of at least one fluid outlet sealing device. The at least one housing-side fluid outlet sealing part can sealingly interact with at least one corresponding connection-side fluid outlet sealing part of the connecting part. The at least one second gas passage can be sealed against the at least one fluid outlet with the at least one fluid outlet sealing device. In this way, the risk can be reduced that gas from the at least one second gas passage can enter the at least one fluid outlet and/or that separated fluid from the at least one fluid outlet can enter the at least one second gas passage.

The connecting part serves to connect the housing with the connection device, in particular with a corresponding fluid line or gas line. At least one part of the connecting part can be a part of the housing, or fixedly or releasably connected thereto, in particular pre-installed. Alternatively or additionally, at least one part of the connecting part can be a part of the connection device, or fixedly or releasably connected thereto, in particular pre-installed. Accordingly, the at least one connection-side fluid outlet sealing part can be fixedly or removably connected with the connecting part and/or the connection device.

The at least one housing-side fluid outlet sealing part can sealingly interact with the at least one connection-side fluid outlet sealing part, in particular automatically, when the housing is correspondingly connected with the at least one corresponding fluid outlet sealing part of the connecting part and/or the connection device.

The connection device can advantageously be a connector head. The connector head can have corresponding feed lines and/or discharge lines for the gas and/or separated fluid.

The connecting part can advantageously be fixedly or removably connected with the housing on the housing side and/or with the connection device on the connection side.

Advantageously, the connecting part can have a tube-like, in particular cylindrical and/or conical, connection piece or connection section. The tube-like connection piece can, in particular when it is connectible on the housing side and removable, also be referred to as a nipple or a connection nipple.

Advantageously, the housing can be connected with the connection device by means of a screw and/or plug-in connection. The screw and/or plug-in connection can advantageously be pluggable or screwable with respect to the axis. In this case, the axis can coincide with an assembly axis of the housing with the connection device, in particular the housing with the connecting part and/or the connecting part with the connection device. The housing can in particular be screwed by means of a screw connection directly or indirectly, in particular by means of the connecting part, in or on the connection device.

Advantageously, the axis, in particular the assembly axis, can be coaxial or parallel to a housing axis of the housing and/or an element axis of a filter element and/or separating element. The axis can advantageously be coaxial with an axis of the connecting part.

The connecting part can have at least a connection element for connection with the housing and/or the connection device, in particular by means or a screw and/or plug-in connection, in particular a screw connection, a plug connection, a clamp connection, a latching connection and/or a bayonet-type connection or the like. In particular, the connecting part may have at least on external thread and/or at least one internal thread. Accordingly, the housing and/or the connection device can have at least one suitable inner thread and/or at least one outer thread. The thread can advantageously be coaxial with the axis, in particular the assembly axis.

The housing can advantageously be cup-shaped or pot-shaped. Advantageously, the housing, in particular a housing vessel, can be closed on one end face by a housing cover. Advantageously, the connecting part and/or the connection device can be especially optionally connected with the housing cover at one end face.

Advantageously, the housing, in particular the housing vessel and/or the housing cover, can be made of metal and/or plastic or at least have these materials.

Advantageously, the housing, in particular the housing vessel and/or the housing cover, can be axial or coaxial to the axis, in particular the assembly axis.

In the housing can advantageously be disposed at least one separating element for separating the fluid from the gas, in particular at least one filter element, at least one coalescing element, at least one separation or baffle wall and/or a cyclone or the like, or a combination of various separating elements. The fluid can be separated from the gas by means of the at least one separating element.

Advantageously, disposed in the housing can be at least one filter device for filtering gases, in particular an air filter element.

Advantageously, at least one filter medium can be combined or connected with at least one separation medium, in particular a coalescing medium, for the fluid, in particular a liquid. In this way, the assembly space requirement can be reduced.

Advantageously, at least one separation element and/or at least one filter device, in particular a filter medium, can circumferentially surround, in particular completely, the axis, in particular the assembly axis. In particular, the at least one separation element and/or the at least one filter device can be axial or coaxial with the axis, in particular the assembly axis.

Advantageously, the at least one first gas passage can be provided for a flow of gas during operation of the device for separating a fluid, which is oriented oppositely with respect to an interior of the housing to a flow of gas through the at least one second gas passage. Advantageously, the at least one first gas passage can be a gas outlet for treated gas. The at least one second gas passage can be a corresponding gas inlet for gas to be treated. Alternatively, the at least one first gas passage can be a gas inlet, and the at least one second gas passage can be a gas outlet.

The at least one separation element and/or the at least one filter device can advantageously be disposed between at least one gas inlet and at least one gas outlet and separate these from one another. In this way, the at least one separation element and/or the at least one filter device can be forcibly flowed through by the gas.

The gas can flow through the at least one separation element and/or the at least one filter device from radially outside to radially inside with respect to the axis, in particular the assembly axis, or vice versa, depending on which of the gas passages serves as the gas inlet, and which serves as the gas outlet.

The at least one fluid, in particular a liquid such as oil, can be separated from the gas with the at least one separation element. Following gravity, the fluid can drop downwards into a lower region of the housing.

Advantageously, the at least one fluid outlet in the lower region can lead out of the housing. The separated fluid can thus exit the housing through the at least one fluid outlet. The at least one fluid outlet can be connected with a fluid channel, in particular in or on the connecting part and/or the connection device. Advantageously, the at least one housing-side fluid outlet sealing part can be disposed on an end face of the housing, in particular where appropriate the housing cover.

Advantageously, the at least one housing-side fluid outlet sealing part can extend at least partially circumferentially with respect to the axis, in particular the assembly axis. Advantageously, the at least one housing-side fluid outlet sealing part can completely circumferentially surround the axis, in particular the assembly axis.

Advantageously, the at least one housing-side fluid outlet sealing part can particularly completely circumferentially surround at least one, in particular downstream with respect to the flow of fluid, section of the at least one fluid outlet.

Advantageously, the at least one second gas passage can be disposed with respect to the axis, in particular the assembly axis, radially outside the at least one housing-side fluid outlet sealing part.

Advantageously, a plurality of second gas passages can be disposed circumferentially, in particular evenly distributed, with respect to the axis, in particular the assembly axis.

Advantageously, at least one first gas passage, at least one second gas passage and at least one fluid outlet can be disposed on the same side of the housing, in particular on or in the housing cover. In this way, a connection of the housing with the connecting part and/or the connection device can be more easily and/or space-savingly realized.

Advantageously, the invention can be used in a gas/oil separator apparatus, in particular an air/oil separator apparatus, in particular with a so-called air/oil separator box or a so-called air/oil separator element. With a gas/oil separator apparatus, any oil droplets carried with the gas can be separated and removed. Such gas/oil separator apparatuses can advantageously be used in compressors, vacuum pumps or pneumatic systems. They can be disposed before a gas inlet of the corresponding unit. In this way, the gas can be deoiled before it enters the unit. Alternatively or additionally, the at least one gas/air separator apparatus can be disposed after a gas outlet of the unit. In this way, oil, which can enter the gas in particular during operation of the unit, can be removed after emission from the unit. The connection device can advantageously be provided with corresponding gas lines.

The invention can also be used in connection with an internal combustion engine, in particular an intake duct for combustion gas, in particular combustion air, or a crankcase vent. The invention can be used in internal combustion engines of motor vehicles or other types of internal combustion engines, in particular industrial motors. It can also be used outside of internal combustion engines, in particular in motor vehicles.

Instead of in a device for separating oil, the invention can also be used for the separation of other types of fluids from gas. It can also be used in connection with a room air conditioning system or air conditioner.

In an advantageous embodiment, at least one housing-side fluid outlet sealing part can, with respect to the axis, in particular the assembly axis, at least radially sealingly interact with at least one connection-side fluid outlet sealing part. According to the invention, in the connection of the housing with the connecting part and/or the connection device, the housing-side fluid outlet sealing part and the connection-side fluid outlet sealing part can lie at least radially directionally against each other.

Advantageously, sealing forces acting on the fluid outlet sealing parts can be directed exclusively radially with respect to the axis, in particular the assembly axis. In addition, axial force components can also be present. The fluid outlet sealing parts can then seal radially and axially.

A radially sealing sealing device has the advantage that the sealing forces are substantially directed perpendicularly to the corresponding assembly force, which acts between the housing on one side and the connecting part and/or the connection device on the other. The assembly forces are parallel or coaxial with the axis, in particular the assembly axis. In this way, any dimensional tolerances between the housing and the connecting part and/or the connection device can be better compensated. Furthermore, mechanical loads on the at least one fluid outlet sealing device can thus be reduced. Such mechanical loads can be caused in particular by operational vibrations or oscillations.

Furthermore, when the housing is brought together with the connecting part and/or the connection device axially with the axis, in particular the assembly axis, the radially acting fluid outlet sealing device can easily compensate a dimensional tolerance in the axial direction.

In a further advantageous embodiment, at least one housing-side fluid outlet sealing part can have at least one sealing surface acting radially inward or preferably radially outward, which is formed on at least one sealing lip and/or at least one sealing ring, in particular an O-ring, extending at least radially with respect to the axis, in particular the assembly axis. When the housing is brought together with the connecting part and/or the connection device axially to the axis, in particular the assembly axis, a sealing lip or a sealing ring can easily slide along against the at least one corresponding connection-side fluid outlet sealing part.

Advantageously, at least one housing-side fluid outlet sealing part and at least one connection-side fluid outlet sealing part can be coaxial with an axis, in particular with the axis, in particular with the assembly axis. In this way, the corresponding fluid outlet sealing parts can be more easily guided into one another. The fluid outlet sealing parts can thereby easily slide alone one another.

Advantageously, the at least one connection-side fluid outlet sealing part can have at least one sealing surface. Advantageously, the at least one sealing surface can be cylindrical and/or conical. Advantageously, one axis of the at least one cylindrical/conical sealing surface can be parallel or coaxial to the axis, in particular the assembly axis.

Advantageously, at least one housing-side fluid outlet sealing part can be at least partially elastic. In this way, the at least one housing-side fluid outlet sealing part can more easily conform to the corresponding at least one connection-side fluid outlet sealing part. Further, tolerances can thus be compensated and/or vibrations can thus be dampened better and more easily.

Advantageously, the at least one sealing lip and/or at least one sealing ring can be elastic, in particular made from an elastic material.

Advantageously, at least two sealing lips can be provided. At least two sealing lips can be disposed behind one another in the direction of an axis, in particular the axis, in particular the assembly axis. In this way, the sealing effect can be further improved.

O-rings have the advantage that they can easily slide or roll along the corresponding sealing surface of the connection-side fluid outlet sealing part during assembly of the respective components.

In a further advantageous embodiment, at least one housing-side fluid outlet sealing part can be realized in connection with at least one support part, which can be connected in one piece or multiple pieces with at least one housing section, in particular a housing cover, of the housing. At least one housing-side fluid outlet sealing part can be pre-assembled separately with the at least one support part. The pre-assembled assembly can be easily connected in further manufacturing steps to the at least one housing.

The at least one support part can advantageously be connected in one piece or multiple pieces with at least one housing section.

Advantageously, the at least one support part can be connected with the at least one housing section by means of a material fitting and/or form fitting and/or force locking connection, in particular an adhesive connection, welded connection, clamp connection, snap connection, clip connection, screw connection, plug connection and/or a bayonet-like connection.

Advantageously, the at least one support part can be connected with the at least one housing section by means of a, in particular removable, fixing element. The at least one fixing element can advantageously have at least one locking element, in particular a locking arm. The at least one locking arm can have at least one locking lug. The locking lug can be latched or clipped on the side of the housing section.

At least one locking arm can advantageously be locked or clipped on the housing side in at least one passage, in particular a gas passage. The at least one locking arm can advantageously pass through the at least one passage.

The at least one support part can advantageously be connected with a housing cover of the housing.

The at least one support part can advantageously have at least one housing-side fluid outlet sealing part or a receptacle for at least one housing-side fluid outlet sealing part.

The at least one support part can advantageously have at least one sealing lip and/or a sealing groove for a sealing ring.

The at least one housing-side fluid outlet sealing part can advantageously be realized in one piece or multiple pieces on the at least one support part. The at least one support part can advantageously be realized with at least one housing-side fluid outlet sealing part as a two-component part.

In a further advantageous embodiment, the support part can have a first, in particular cylinder-shaped, section, which extends axially outward from the housing section. Hereby, the housing-side fluid outlet sealing part is preferably disposed on the support part, in particular the axial end thereof, such that it extends radially away therefrom, in particular outwardly or inwardly in a ring shape.

The at least one support part can be, in comparison with at least one housing-side fluid outlet sealing part, rigid or dimensionally stable. In this way, the at least one support part can absorb or transfer forward corresponding holding forces and/or sealing forces which can act upon the at least one housing-side fluid outlet sealing part.

The at least one support member can advantageously be annular. It can advantageously circumferentially surround the axis, in particular the assembly axis. The at least one support part can advantageously be coaxial with the axis, in particular the assembly axis.

In a further advantageous embodiment, at least one surrounding sealing device, which can sealingly interact with at least one corresponding, in particular terminal-side and/or connection-side surrounding sealing part of the connection device and/or the connecting part, can be disposed at least between at least one second gas passage and a surrounding of at least one housing-side surrounding sealing part. With the surrounding sealing device, the at least one second gas passage can be sealed towards the surrounding. The space surrounding the housing in its assembly position on the connection device is regarded as the surrounding.

The at least one second gas passage can lie relatively far outward with regard to the axis, in particular the assembly axis. In particular, it can be disposed further outward than the at least one fluid outlet and/or the at least one first gas passage with respect to the axis, in particular the assembly axis.

The housing-side surrounding sealing part can advantageously have at least one seal and/or at least one sealing surface. Accordingly, the at least one in particular terminal-side and/or connection-side surrounding sealing part can have at least one sealing surface and/or at least one seal.

The at least one housing-side surrounding sealing part can advantageously at least axially sealingly interact with the at least one in particular terminal-side surrounding sealing part. In this way, a holding force of the housing against the connection device and/or the connecting part, which is directed parallel to the axis, in particular the assembly axis, can more strongly press the surrounding sealing parts together. A sealing effect can thus be improved.

At least one housing-side surrounding sealing part and at least one housing-side fluid outlet sealing part can advantageously be disposed on the same end face of the housing, in particular the housing cover.

The at least one housing-side surrounding sealing part can advantageously at least partially circumferentially surround at least one housing-side fluid outlet sealing part with respect to the axis, in particular the assembly axis. In this way, the at least one first gas passage and the at least one fluid outlet can also be sealed toward the surrounding.

The at least one surrounding sealing device can also be referred to as an outer sealing device, and the corresponding sealing parts as outer sealing parts. Accordingly, the at least one fluid outlet sealing device can be referred to as an inner sealing device and the sealing parts thereof as inner sealing parts.

Advantageously, the combination of the at least one at least radially acting fluid outlet sealing device and the at least one at least axially acting surrounding sealing device can allow greater dimensional tolerances in the device, in particular in the housing and/or the connection device, for separating at least one fluid.

In a further advantageous embodiment, at least one first gas passage can have an assembly opening for at least one connecting part, in particular a nipple or a pipe stub, and at least one fluid outlet can have at least one passage opening, which is materially technically separated from the at least one assembly opening.

The at least one connecting part can be introduced in the assembly opening. The at least one connecting part can be passed in through the assembly opening and led into an interior of the housing.

In an assembled housing, an axis of the at least one connecting part can advantageously run axially, in particular coaxially, to the axis, in particular the assembly axis. For installation, the at least one connecting part can thus be passed axially to the axis, in particular the assembly axis, through the assembly opening.

The at least one connecting part can advantageously be connected with the assembly opening by means of a screw or plug-in connection, in particular a screw connection.

Advantageously, a radially outer peripheral side of the at least one connecting part can have an outer thread, which can be screwed in to connect to the housing having a corresponding inner thread in the region of the assembly opening.

At least one fluid outlet can advantageously have at least one passage opening, which is materially technically separated from the at least one assembly opening. Advantageously, at least one fluid outlet can be radially spaced from the at least one assembly opening with respect to the axis, in particular the assembly axis. Between the at least one assembly opening and the at least one fluid outlet can be located at least one material section, in particular a web of material of the housing, in particular the housing cover. The material section can separate the assembly opening from the fluid outlet. In particular when a screw connection is used between the connecting part and the housing, the inner thread in the region of the axis, in particular the assembly axis, can thus interact evenly and completely with the outer thread of the connecting part.

In a further advantageous embodiment, at least one gas passage and/or at least one fluid outlet and/or at least one housing-side fluid outlet sealing part and/or at least one housing-side surrounding sealing part can be realized in/on/with a housing cover with an in particular cup-shaped housing. In this way, the mentioned components can be easily realized on the housing cover. The housing cover can be realized and/or pre-assembled independently from the remaining housing, in particular the housing vessel.

During assembly of the device for separation of a fluid, a corresponding separation and/or filter element can be easily introduced into the housing. The housing can then be closed by the housing cover.

The pre-assembled housing can be easily fitted with the connecting part. Alternatively, the connection device can be fitted with the connecting part. The housing and the connection device can then be connected. The connecting part is thereby correspondingly connected with the respective other component. During connection, the gas passages and the at least one fluid outlet can be automatically brought into connection with the corresponding gas channels and fluid channels of the connecting part and/or the connection device. Likewise, depending on the mounting method, the fluid outlet sealing device and optionally the surrounding sealing device can be respectively automatically activated in the same assembly step or in different assembly steps.

Further, the object according to the invention is achieved by the housing cover in that between the at least one second gas passage and the at least one fluid outlet is disposed at least one housing-side fluid outlet sealing device, which can sealingly interact with at least one corresponding connection-side fluid outlet sealing part or a connecting part, which is provided for connecting the housing with the connection device.

In addition, the object according to the invention is achieved by the connecting part in that the connecting part has at least one fluid passage or is at least constructed for at least one fluid outlet of the housing for the fluid separated from the gas, which is disposed outside the at least one gas-conducting space, and at least one connection-side fluid outlet sealing part of the at least one fluid outlet sealing device is disposed on a side opposite the gas-conducting space of the at least one fluid outlet, which can sealingly interact with at least one corresponding housing-side fluid outlet sealing part.

The connecting part comprises at least one connection-side fluid outlet sealing part, in particular at least one sealing surface and/or one sealing receptacle, in particular a sealing groove, for at least one seal and/or at least one seal, at least one fluid outlet sealing device, which can sealingly interact with at least one housing-side fluid outlet sealing part of the at least one fluid outlet sealing device.

Advantageously, the at least one connection-side fluid outlet sealing part can have at least one radially oriented sealing surface, in particular extending circumferentially and axially with respect to the axis, in particular the assembly axis. Advantageously, the at least one sealing surface can have the form of a cylinder shell, in particular a circular cylinder shell.

Finally, the object is achieved according to the invention with a device for separating a fluid in that between the at least one second gas passage and the at least one fluid outlet is disposed at least one housing-side fluid outlet sealing device, which sealingly interacts with at least one corresponding connection-side fluid outlet sealing part or a connecting part, which is provided for connecting the housing with the connection device.

Furthermore, the features and advantages associated with the housing according to the invention, the housing cover according to the invention, the connecting part according to the invention and the device according to the invention and all respective preferred embodiments thereof apply accordingly to one another and vice versa. Of course, the individual features and advantages can be combined with one another, whereby further advantageous effects can be configured which extend beyond the sum of the individual effects.

BRIEF DESCRIPTION OF THE DRAWINGS

Further advantages, features and details of the invention will become apparent from the following description in which exemplary embodiments of the invention with reference to the drawings are explained in more detail. A person skilled in the art will also appropriately consider the features disclosed in the drawings, the description and the claims individually and combine them into further sensible combinations. Shown schematically are:

FIG. 3 shows an isometric view of the housing cover of FIGS. 1 and 2 with a view of the inside of the housing cover;

FIG. 4 shows the housing cover of FIGS. 1 to 3 with a view of the outside thereof;

FIG. 5 shows a longitudinal section of the housing cover of FIGS. 1 to 4;

In the figures, identical components are provided with the same reference characters.

DETAILED DESCRIPTION

In FIGS. 1 to 8 is shown an air/oil separator apparatus 10 in various depictions, sections and detail views. The air/oil separator apparatus 10 serves for the separation from the air of such oil as is carried with the air. The air/oil separator apparatus is used, for example, in compressors, vacuum pumps compressed air systems or the like. It can be disposed before the inlet or after the outlet of a corresponding unit.

Figure 1:
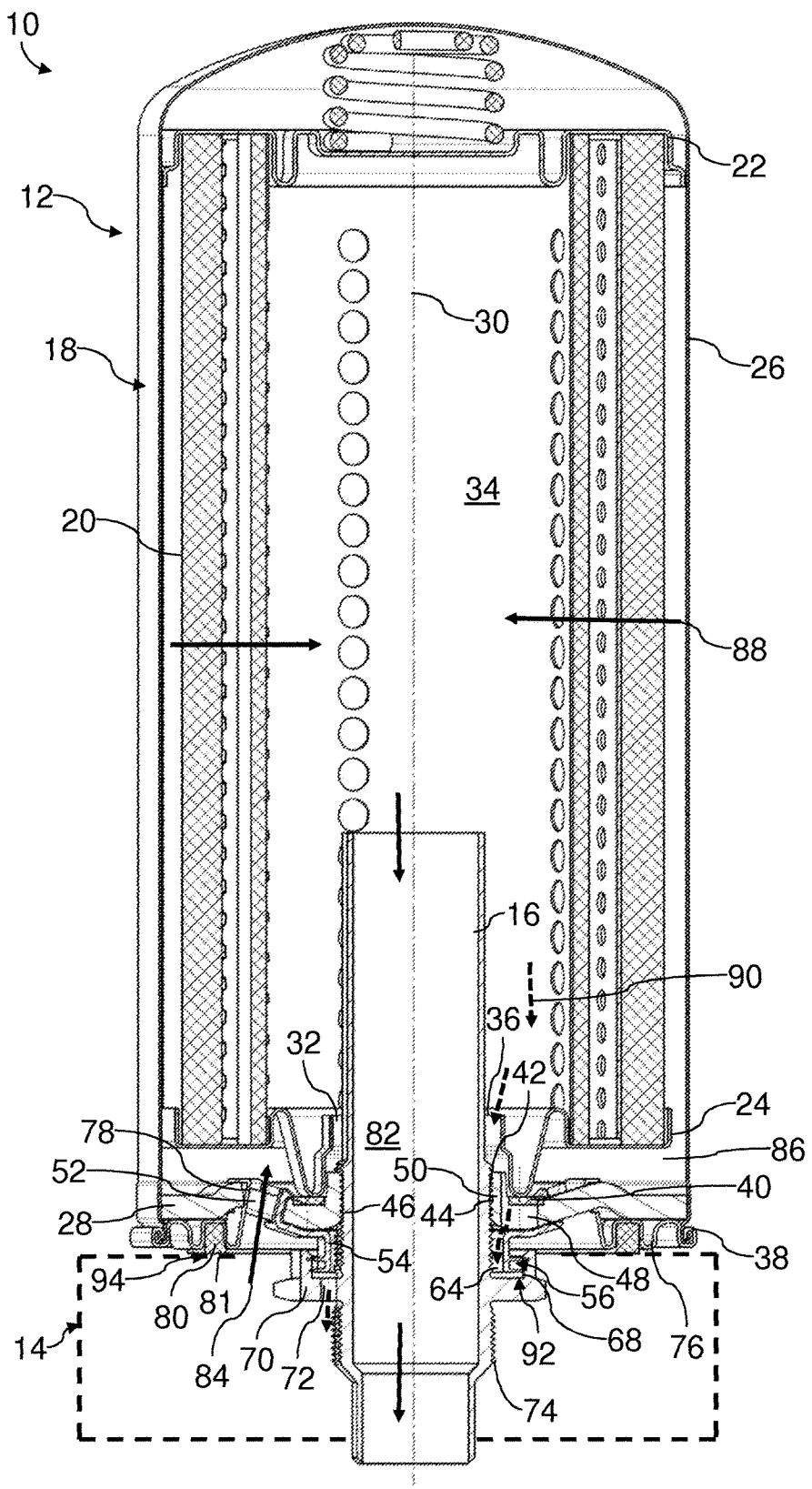
FIG. 1 shows a longitudinal section of an air/oil separator apparatus with an air/oil separator element according to a first exemplary embodiment, with a housing having a housing cover with a support ring and an oil outlet seal and a connection nipple, for connection with a connector head.

The air/oil separator apparatus 10 comprises an air/oil separator element 12, which can also be referred to as an air/oil separator box. The air/oil separator element 12 is replaceably fixed on a connector head 14, at the bottom of FIG. 1. The connector head 14 serves as a connection device for corresponding air lines and oil lines for connecting with the corresponding unit. In FIG. 1, the connector head 14 is only indicated schematically by dashed lines. A hollow, pipe stub-like connection nipple 16 connects the air/oil separator element 12 with the connector head 14. The interior of the connection nipple 16 is gas-conducting, in particular air-conducting.

The air/oil separator element 12 comprises a cup-shaped housing 18. In the housing 18 is disposed by way of example a filter element 20 designed as a ring-shaped coalescing element. By way of example, the filter element 20 has as a filter medium a glass fiber mat, which is repeatedly annularly wrapped and bounded by an upper end plate 22 and a lower end plate 24 facing the connector head 14. As a further filter medium, a non-woven material is disposed in the interior of the glass fiber wrap.

Figure 2:
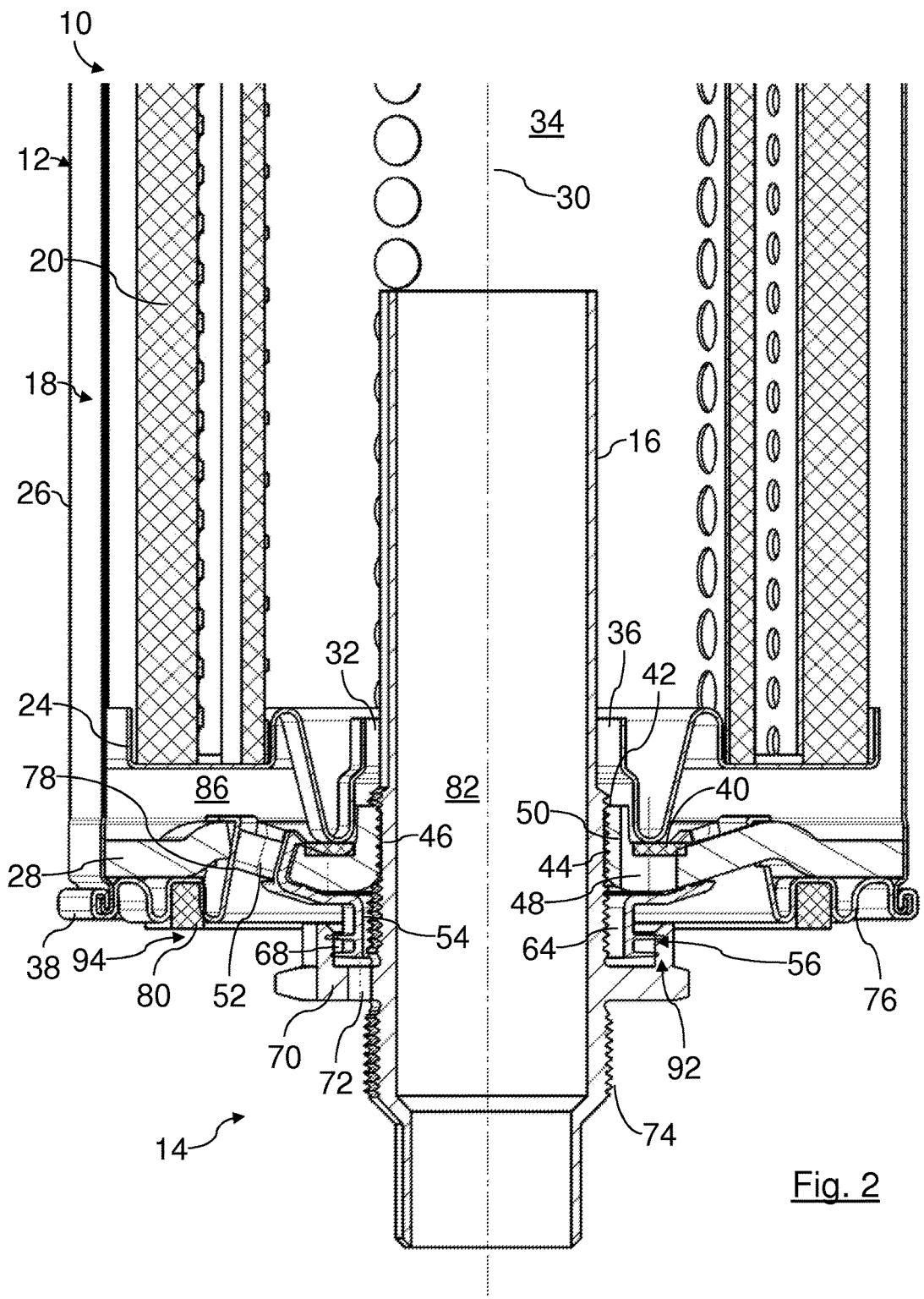
FIG. 2 shows a detail view of the air/oil separator apparatus of FIG. 1 in the region of the housing cover.
Figure 7:
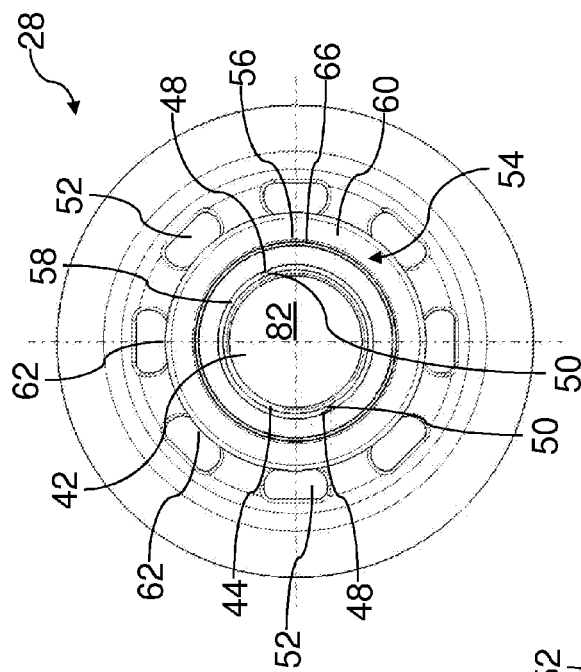
FIG. 7 shows a top view of the outside of the housing cover of FIGS. 1 to 6.
Figure 8:
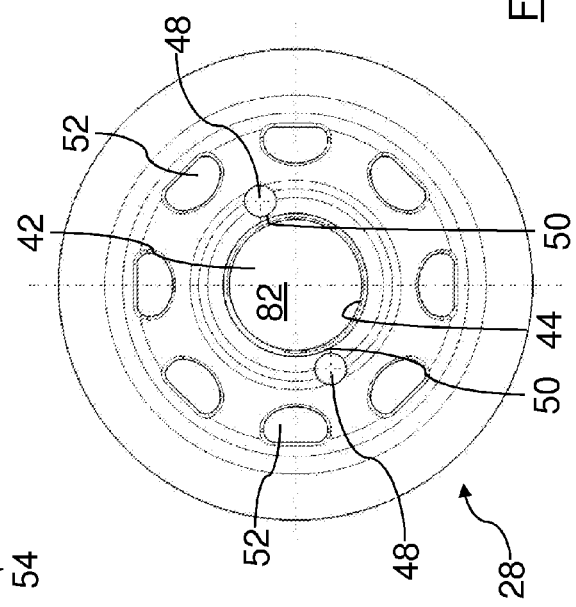
FIG. 8 shows a top view of the outside of the housing cover of FIGS. 1 to 7 without support ring and oil outlet seal.
Figure 6:
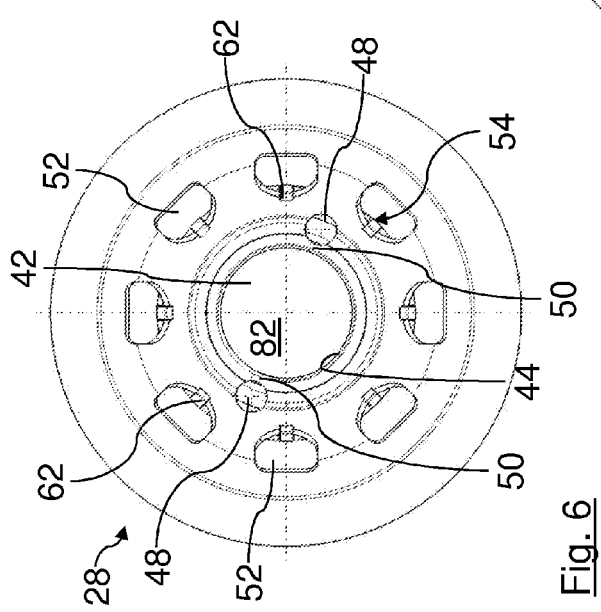
FIG. 6 shows a top view of the inside of the housing cover of FIGS. 1 to 5.
Figure 10:
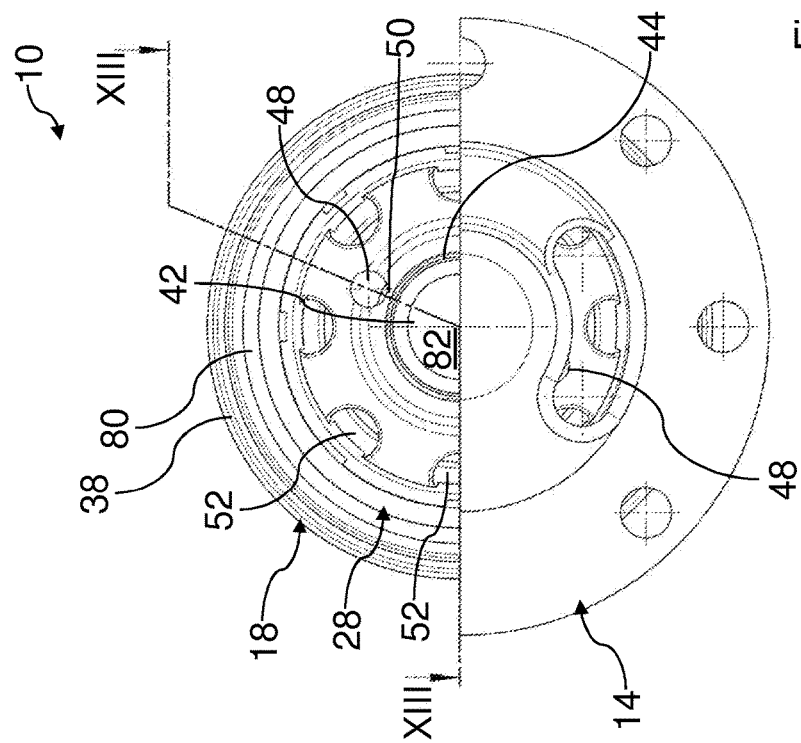
FIG. 10 shows the partial section of the air/oil separator apparatus of FIG. 9 without connection nipple, support ring and oil outlet seal.
Figure 9:
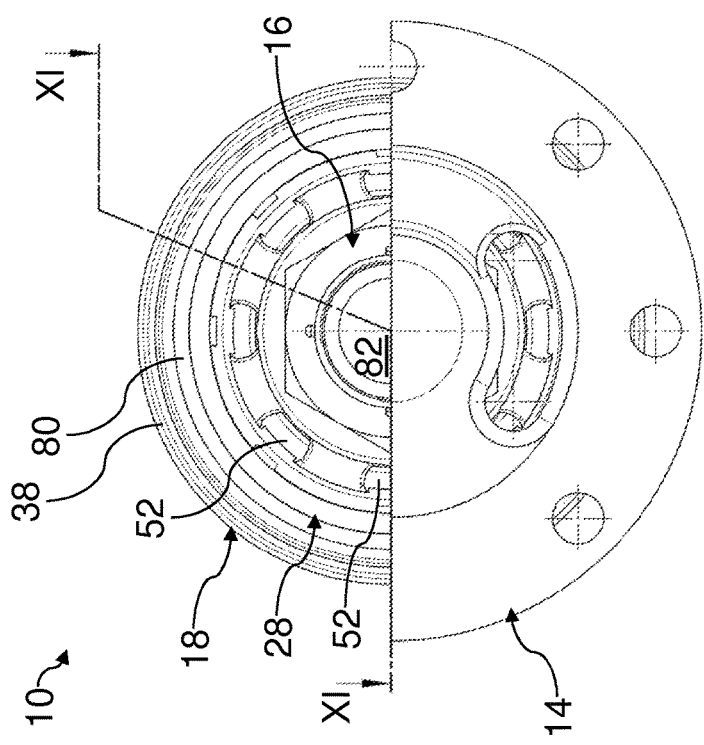
FIG. 9 shows a transverse partial section of an air/oil separator apparatus according to a second embodiment, which is similar to the air/oil separator apparatus of FIGS. 1 to 8, with a viewing direction from the connector head to the housing cover.
Figure 11:
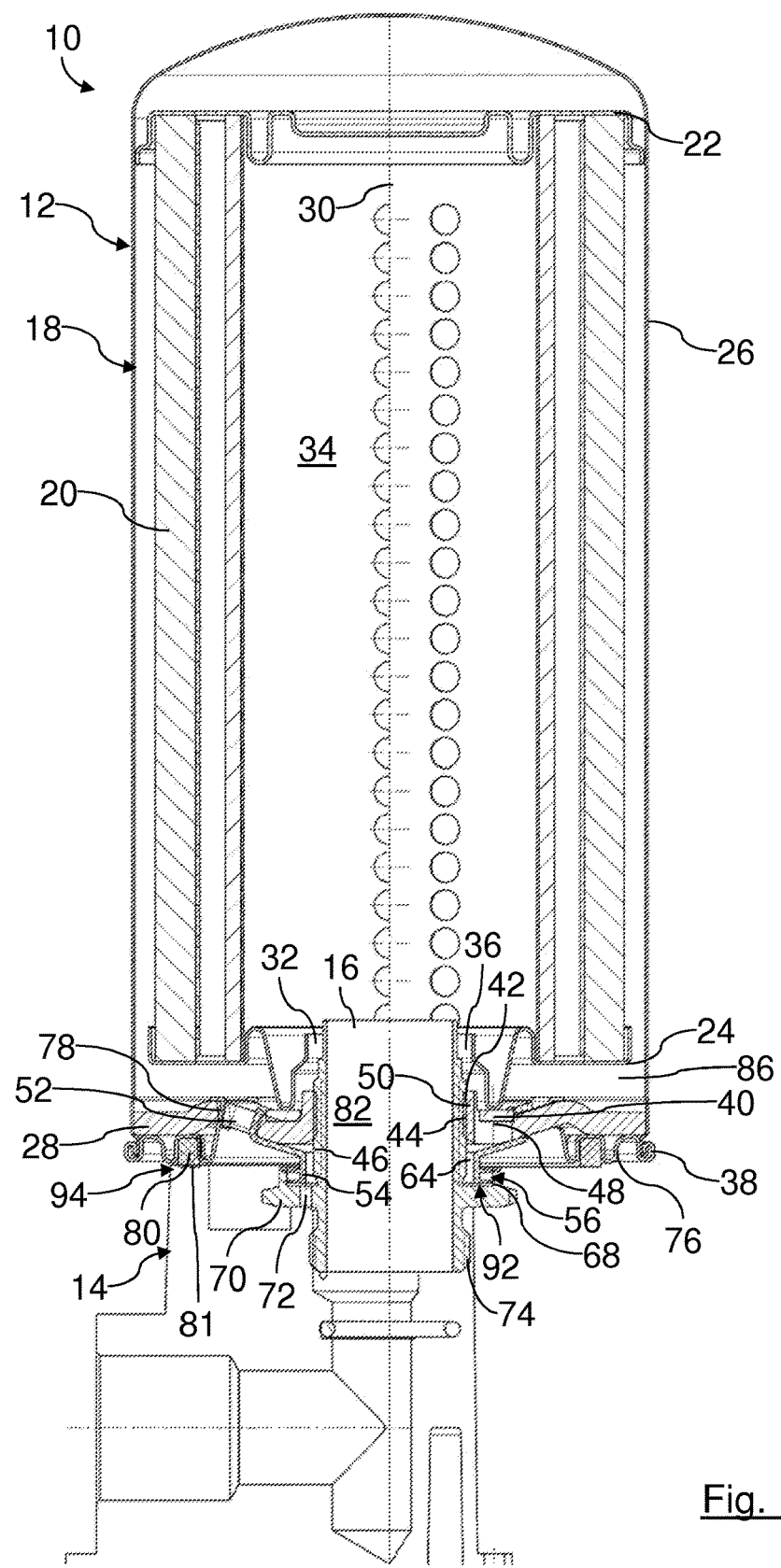
FIG. 11 shows a longitudinal section of the air/oil separator apparatus of FIG. 9 along the section line XI-XI.
Figure 12:
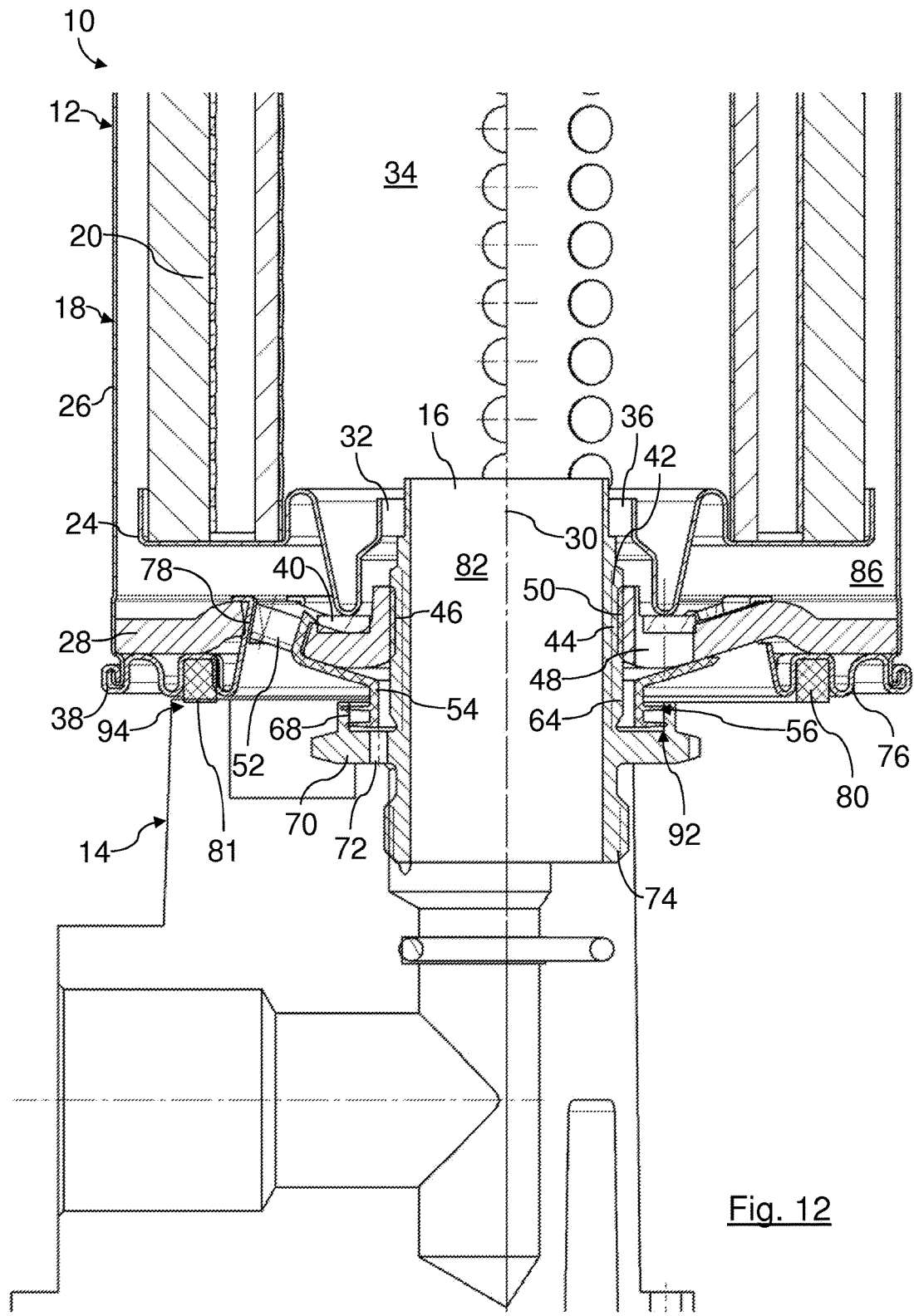
FIG. 12 shows a detail view of the longitudinal section of FIG. 11 in the region of the housing cover.
Figure 13:
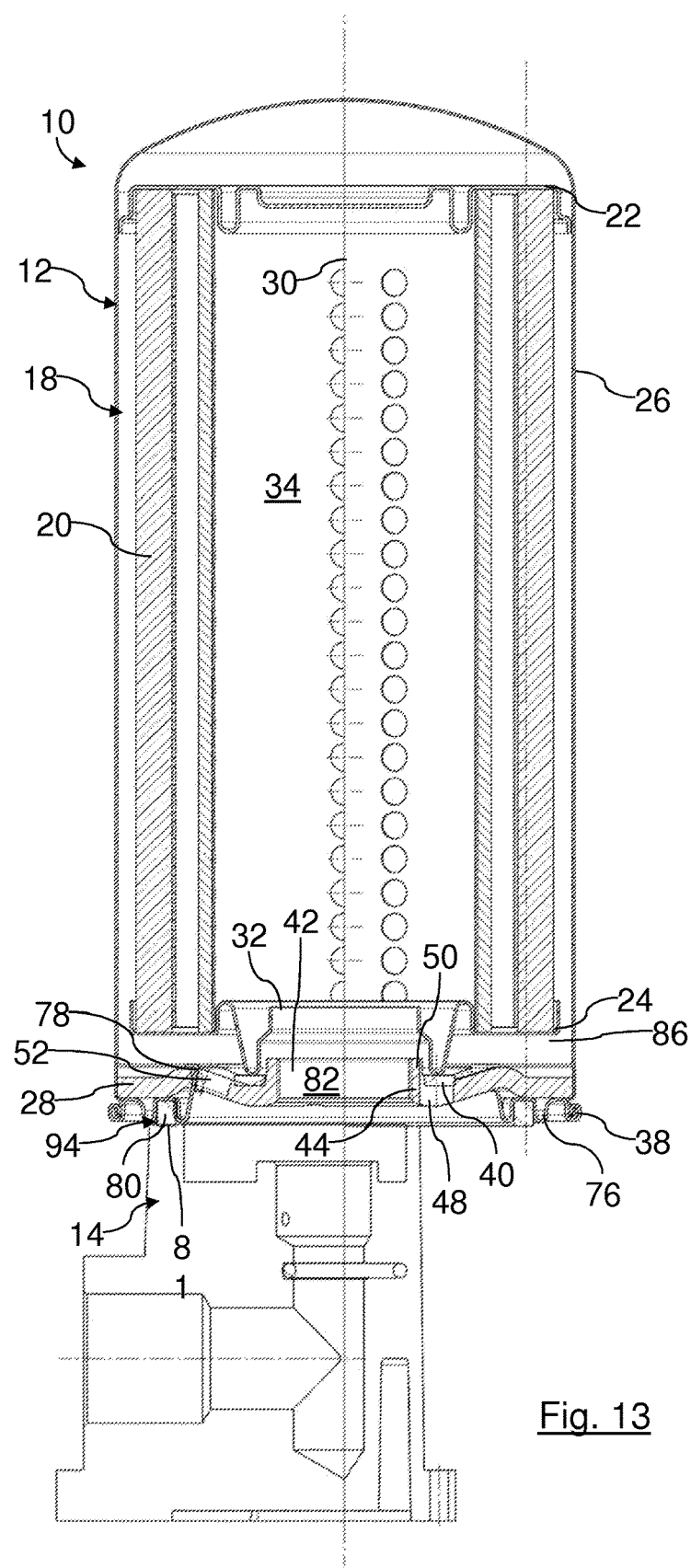
FIG. 13 shows a longitudinal section of the air/oil separator apparatus of FIG. 10 along the section line XIII-XIII.

In general, the air/oil separator apparatus 10 is ready for use as disposed in the orientation shown in FIGS. 1 and 2. It can, however, also be disposed in other orientations. When further reference is made to "below," "above," or similar, this refers unless otherwise stated to the representation in FIGS. 1 and 2.

The housing 18 comprises a housing vessel 26, the opening of which facing the connector head 14 is closed with a housing cover 28. The housing vessel 26 and the housing cover 28 are made, for example, of metal. Alternatively, at least one of the two components can be made from another material, for example plastic, or at least have another material.

The housing cover 28 is shown in detail in FIGS. 3 to 8. In an operation-ready assembly, the housing 18, the filter element 20 and the connection nipple 16 are respectively coaxial with an imaginary assembly axis 30. The air/oil separator element 12 can be screwed onto the connector head 14 and unscrewed therefrom about the assembly axis 30 by means of the connection nipple 16.

When further reference is made to "radial," "axial," "coaxial" or "circumferential" or the like, this refers unless otherwise stated to the assembly axis 30.

The lower end plate 24 facing the housing cover 28 is approximately annular. It has a coaxial pass-through opening 32 for the connection nipple 16. Radially between the pass-through opening 32 and the filter medium of the filter element 20, the lower end plate 24 is repeatedly bent, such that there is a circumferential annular trough, which opens toward the element interior 34 of the filter element 20.

The radially inner edge of the lower end plate 24 surrounds the pass-through opening 32. It points toward the element interior 34. An inner diameter of the pass-through opening 32 is larger than an outer diameter of the connection nipple 16 there. Between the radially outer peripheral wall of the connection nipple 16 and the radially inner edge of the pass-through opening 32, an annular, coaxial passage gap 36 remains for the separated oil.

The housing cover 28 is held on the housing vessel 26 by means of a retaining ring 76, as will be explained in greater detail below. The retaining ring 76 is connected by means of a flared connection 38 with the edge of the housing vessel 26.

The axial outside of the lower end plate 24 bounded by the annular trough extends over the filter medium in the axial direction. A bottoming of the annular trough-forming section of the outside of the lower end plate 24 sits peripherally connected in the axial direction to a dampening ring 40. The dampening ring 40 is supported on the axially opposite side on an inner side of the housing cover 28. The damping ring 40 is coaxial with the assembly axis 30. It serves inter alia to reduce noise as a so-called rattle guard. It restricts the axial movability of the filter element 20 in the housing 18 and thus prevents rattling noises. The dampening ring 40 can further serve as tolerance compensation and/or as dampening for operational vibrations or oscillations.

The housing cover 28 is substantially circular. It is coaxial with the assembly axis 30. In profile, the housing cover 28, as shown in FIG. 4, is seen from radially outside to radially inside as bent in an approximate S-shape.

In its center, the housing cover 28 has a coaxial assembly opening 42 for the connection nipple 16. A radially inner peripheral wall of the housing cover 28 surrounding the assembly opening 42 is equipped with an inner thread 44. The inner thread 44 mates with a corresponding outer thread 46 on the radially outer peripheral side of the connection nipple 16.

Radially outside the assembly opening 42, the housing cover 28 has two respective oil outlet holes 48 which pass through. The oil outlet holes 48 are disposed on radially opposite sides with respect to the assembly axis 30. Their axes are parallel to the assembly axis 30. The oil outlet holes 48 are materially technically separated from the assembly opening 42 by means of a circular cylindrical, coaxial web portion 50.

Along an imaginary coaxial circumference which encloses both oil outlet holes 48, a plurality of air inlet holes 52 which pass through are disposed. The air inlet holes 42 are respectively flattened on their radially outer peripheral sides. Imaginary axes of the air inlet holes 52 extend parallel to the assembly axis 30.

On the exterior side facing away from the filter element 20, a coaxial support ring 54 is fixed on the housing cover 28. The support ring supports an oil outlet seal 56. The support ring 54 is made of plastic. Instead of plastic, it can also be made of a different material, for instance metal, or at least have a different material.

The support ring 54 has a coaxial hollow cylindrical section 58. On its end face facing the housing cover 28, the hollow cylindrical section 58 changes over as a single piece to a coaxial radial ring section 60. The radial ring section 60 extends continuously circumferentially and somewhat radially outside the hollow cylindrical section 58. The profile of the radial ring section 60 is fitted to the outer side of the housing cover 28.

In the region of its radially outer edge, a plurality of locking arms 62 are each integrally connected with the radial ring section 60. The locking arms 62 extend approximately parallel to the assembly axis 30 away from the hollow cylindrical section 58 to the side opposite the hollow cylindrical section 58. Each locking arm 62 has a radially inwardly oriented locking lug on its free end. The locking arms 62 extend respectively through one of the air inlet holes 52 through the housing cover 28. They engage with their locking lugs on the radially inner side of the air inlet holes 52 on the inner side of the housing cover 28.

An inner diameter of the hollow cylindrical section 58 and the radial ring section 60 is somewhat larger than the inner diameter of the assembly opening 42, in particular the inner thread 44. The oil outlet holes 48 project radially inward beyond the support ring 54 such that they are connected with an interior of the support ring 54 surrounded by the hollow cylindrical section 58.

In the assembled state shown in FIGS. 1 and 2, the radially inner circumferential side of the hollow cylindrical section 58 of the support ring 54 is spaced apart from the radially outer circumferential side of the connection nipple 16 such that an annular gap 64 arises between the corresponding circumferential sides as a passage for the separated oil.

In the region of the free edge of the hollow cylindrical section 58 which faces away from the housing cover 28, two sealing lips 66 are disposed on the radially outer circumferential side of the hollow cylindrical section 58. The sealing lips 66 are part of the oil outlet seal 56. The sealing lips 66 each extend continuously circumferentially and away from the hollow cylindrical section 58 from radially inward to radially outward. The seal lips 66 extend parallel to each other. The axially inner sealing lips 66 facing the housing cover 28 extend radially outward over the other, axially outer sealing lips 66. The sealing lips 66 are elastic. The sealing lips 66 can, for example, be realized with the support ring 54 as a two-component part.

In the assembled air/oil separator element 12, the sealing lips 66, as are shown in FIGS. 1 and 2, are located with their radially inner edges radially sealing against a radially inner circumferential side of a circumferential connection-side sealing surface 68. The connection-side sealing surface 68 is in the form of a coaxial circular cylinder shell. The connection-side sealing surface 68 is realized on a coaxial hollow cylindrical wall section of a coaxial annular collar 70 of the connecting means 16.

The annular collar 70 is disposed circumferentially on the radially outer circumferential side of the connector nipple 16. On the side axially facing the housing cover 28, the ring collar 70 forms an in open, annular groove which is U-shaped in profile, for receiving the cylindrical section 58 with the sealing lips 66 of the support ring 54.

A connection-side oil passage opening 72 leads through an end wall of the annular collar 70 which forms the bottom of the "U." In an assembled air/oil separator apparatus 10, the connection-side oil passage opening 72 connects the annular gap 64 with an oil outlet channel of the connector head 14, not shown in FIGS. 1 and 2.

On the side of the ring collar 70 axially opposite to the outer thread 46, the connection nipple 16 has a connecting outer thread 74 on its radially outer circumferential side, with which the connection nipple 16 is screwed into a corresponding connection-side inner thread of the connector head 14, which is also not shown in FIGS. 1 and 2.

The retaining ring 76 which is, for example, made of sheet metal and bent several times in the radial direction, is radially outwardly connected with the flared connection 38 to the housing vessel 26. The retaining ring 76 holds the housing cover 28 on the outside thereof. On its radially inner edge, the retaining ring 76 has retaining tabs 78, which extend respectively through one of the air inlet holes 52 of the housing cover 28, and which are bent on the inner side thereof. The housing cover 28 is held on the retaining ring 76 with the retaining tabs 78.

Further, radially within the flared connection 38, the retaining ring 76 comprises a coaxially annularly-shaped, circumferentially continuous sealing groove, in which is disposed a coaxial surrounding ring seal 80. The surrounding ring seal 80 radially outwardly surrounds the air inlet holes 52. In the assembled air/oil separator element 12, the surrounding ring seal 80 is located axially sealingly on a corresponding terminal-side annularly-shaped coaxial surrounding sealing surface 81 of the connector head 14, as is shown in FIG. 1. The surrounding sealing surface 81 extends circumferentially and radially. It seals the air inlet holes 52, i.e. the raw air side, toward the surrounding.

The assembly opening 42 of the housing cover 28 further defines an air outlet opening 82. The interior of the connection nipple 16 extends through the air outlet opening 82, thus co-defining the course of the air outlet opening 82 in the assembled state. The interior of the connection nipple 16 forms or bounds in so many words the effective flow cross-section of the air outlet opening 82.

During operation of the air/oil separator apparatus 10, air, which can be loaded with oil droplets, flows from an air inlet line of the connector head 14 through the air inlet holes 52, indicated by an arrow 84 in FIG. 1, into an inlet chamber 86 of the housing 18. the lower part of the inlet chamber 86 is located in the housing 18 between the lower end plate 24 and the housing cover 28, and extends circumferentially radially outward about the filter element 20.

The air flows through the filter medium of the filter element 20 from radially outward to radially inward, indicated by arrow 88. The oil droplets are deposited on the radially inner circumferential side of the filter element 20, and flow downward following gravity, indicated in FIG. 1 by dashed arrows 90.

The air, free of oil droplets, flows in the clean air side through the central air outlet opening 82 in the inner space of the connection nipple 16 out of the air/oil separator element 12, and enters an air outlet channel of the connector head 14, not shown in FIGS. 1 and 2.

The separated oil droplets pass through the passage gap 36 and the oil outlet holes 48 of the housing cover 28 into the annular gap 64. From the annular gap 64, the oil passes through the connection-side oil passage opening 72 into the oil outlet channel of the connector head 14.

The oil outlet seal 56 and the connection-side sealing surface 68 form an oil outlet sealing device 92, which separates the oil outlet with the oil-bearing annular gap 64 and the oil outlet holes 48 from the raw air side, in particular the air inlet with the air inlet holes 52.

The assembly of the air/oil separator apparatus 10 can take place in different ways.

According to a first exemplary method, the connection nipple 16 can then be screwed into the assembly opening 42 of the housing cover 28. Here, the sealing lips 66 slide inwardly along the connection-side sealing surface 68 until they have reached their end position. No substantial axial forces act on the sealing lips 66. In this way, the air/oil separator element 12 can be pre-assembled with the connection nipple 16. Then, the air/oil separator element 12 can be screwed with the free end of the connection nipple 16 forward axially into the corresponding inner thread of the connector head 14. The surrounding ring seal 80 is pressed axially between the housing cover 28 and the connection-side surrounding ring seal surface 81. The surrounding ring seal 80 forms a surrounding seal device 94 with the surrounding ring seal surface 81.

According to a second exemplary method, the connection nipple 16 can then be screwed into the corresponding inner thread of the connector head 14. Then, the air/oil separator element 12 can be screwed with the housing cover 28 forward coaxially to the assembly axis 30 onto the connection nipple 16. The oil outlet sealing device 92 and the surrounding sealing device 94 are thereby respectively activated.

For removal, the air/oil separator element 12 is either screwed off from the connection nipple 16 with respect to the assembly axis 30, or the air/oil separator element 12 is screwed off together with the connection nipple 16 from the connector head 14.

In FIGS. 9 to 13 is shown a second exemplary embodiment of an air/oil separator apparatus 10 in various representations. In the second exemplary embodiment, an axial extension of the connector nipple 16 in the element interior 34 is less than in the first exemplary embodiment of FIGS. 1 to 8. Further, the connector head 14 is shown in more detail in the second exemplary embodiment.

Figure 14:
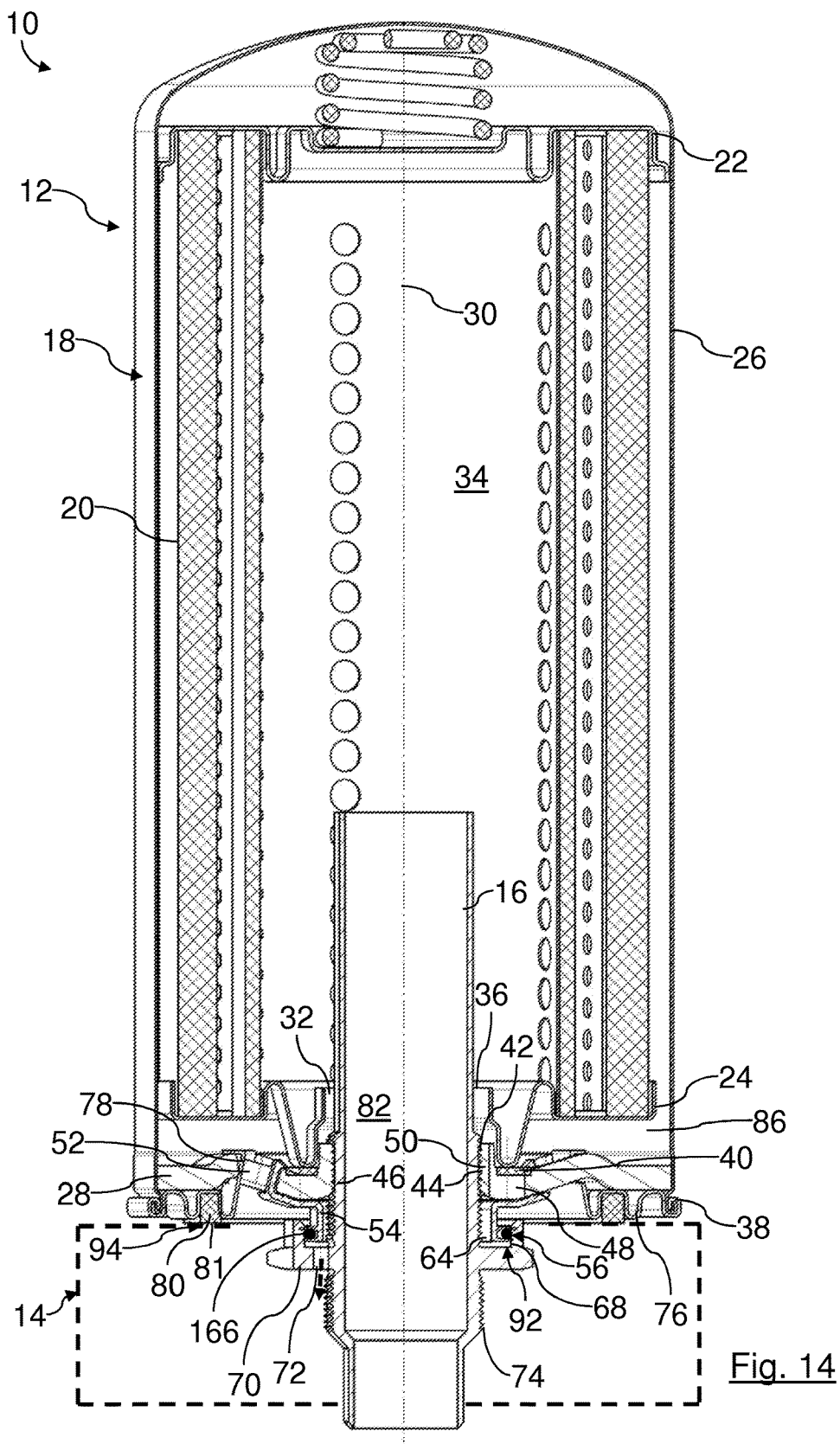
FIG. 14 shows a longitudinal section of an air/oil separator apparatus according to a third exemplary embodiment, in which the oil outlet seal has an O-ring seal.

In FIG. 14 is shown a third exemplary embodiment of an air/oil separator apparatus 10. Unlike the first exemplary embodiment, the oil outlet seal 56 in the second exemplary embodiment has an O-ring seal 166 instead of the sealing lips. The O-ring seal 166 is disposed in a corresponding sealing groove on the radially outer circumferential side of the hollow cylindrical section 58 of the support ring 54. The O-ring seal 166 seals analogously to the sealing lips 66 of the first two exemplary embodiments against the connection-side sealing surface 68 in the radial direction.

What is claimed is:

1. A housing of a separating device for separating a fluid from a gas, wherein:
   the housing having an assembly axis extending longitudinally through the housing, a first axial end of the housing configured to replaceably mount onto a connecting device having a tubular connecting part (16) forming a tubular connection nipple (16) having an outer thread;
   wherein the housing at an first axial end includes a housing cover, the housing cover (28) includes:
   at least one first gas passage extending axially through an annular web portion of the housing cover into an interior of the housing, the at least one first gas passage arranged centrally on the assembly axis of the housing and connecting to the connecting device, said gas passage (82) comprising a central, coaxial assembly opening (42) having a radially inner thread (44) configured and adapted to threadably engage with the outer thread on a radially outer side of the tubular connection nipple (16);
   wherein the annular web portion of the housing cover surrounds the at least one first gas passage and has the radially inner thread for connecting to the connecting device;
   at least one second gas passage extending axially through the housing cover into an interior of the housing, the at least one second gas passage is disposed radially outward from the at least one first gas passage and radially outwardly from the annular web portion of the housing cover;
   at least one fluid outlet opening for fluid separated from the gas arranged at a radially outer side of the annular web portion and spaced apart from the at least one first gas passage by the annular web portion, at least one fluid outlet disposed with regard to the assembly axis radially between the at least one first gas passage and the at least one second gas passage;
   a fluid outlet sealing device having at least one housing-side fluid outlet sealing part (66; 166) provided on the housing cover (28) on an axial outside of the housing cover (28) facing away from the interior of the housing,
   wherein the at least one housing-side fluid outlet sealing part (66; 166) is disposed between the at least one second gas passage (52) and the at least one fluid outlet opening (64);
   wherein the at least one fluid outlet sealing device sealingly interacts in a radial direction with at least one corresponding connection-side fluid outlet sealing part of the tubular connecting part, which is provided for connecting the housing with the connection device.

2. The housing according to claim 1, wherein
   the at least one housing-side fluid outlet sealing part has a sealing surface acting radially inwardly or outwardly to seal against the at least one corresponding connection-side fluid outlet sealing part of the tubular connecting part.

3. The housing according to claim 1, wherein
   an annular sealing device, which is configured to sealingly interact with a connection-side surrounding sealing part of the connection device and/or the connecting part, is disposed between at least one second gas passage and a surrounding portion of at least one housing-side surrounding sealing part.

4. The housing according to claim 3, wherein
   the at least one gas passage and/or the at least one fluid outlet and/or the at least one housing-side fluid outlet sealing part and/or the at least one housing-side surrounding sealing part is realized in/on/with the housing cover covering a cup-shaped housing.

5. The housing according to claim 1, wherein
   the fluid outlet sealing device is secured onto an axially outer surface of the housing cover and forming a continuation of the at least one first gas passage, the fluid outlet sealing device including:
   a support part as a hollow cylindrical body arranged centrally on the assembly axis of the housing and centrally aligned with the at least one first gas passage, the hollow cylindrical body having:
   a coaxial ring arranged on a first axial end of the hollow cylindrical body and projecting radially outwardly from an outer circumferential surface of the hollow cylindrical body, the coaxial ring contacting against the axially outer surface of the housing cover; and
   at least one at least one housing-side fluid outlet sealing part, each as a radially outwardly projecting elastic seal lip formed on a circumferential outer surface of the hollow cylindrical body and surrounding the hollow cylindrical body.

6. A connection nipple or connection tube fitting for connecting a device for separating at least one fluid from a gas, with a connection device having at least one gas-conducting space for at least one first gas passage of a housing of the device,
   wherein the connection nipple or connection tube fitting has a radially outwardly projecting an annular collar formed on and closing circumferentially about a outer surface of the connection nipple or connection tube fitting, the annular collar forming an annular U-shaped groove configured to receive into and seal to at least one fluid outlet sealing device of the housing;
   wherein the connection nipple or connection tube fitting has at least one fluid passage or is at least constructed for at least one fluid outlet of the housing for the fluid separated from the gas, which is disposed outside the at least one gas-conducting space, and at least one connection-side fluid outlet sealing part of the at least one fluid outlet sealing device is disposed on a side opposite the gas-conducting space of the at least one fluid outlet, which can sealingly interact with at least one corresponding housing-side fluid outlet sealing part.

7. A housing cover of a housing of a separating device separating fluid from a gas, comprising:
   at least one first gas passage extending axially through an annular web portion of the housing cover, the at least one first gas passage arranged centrally on the assembly axis of the housing, said gas passage (82) comprising a central, coaxial assembly opening (42) having a radially inner thread (44) configured and adapted to threadably engage with an outer thread on a radially outer side of a tubular connection nipple (16);
   wherein the annular web portion of the housing cover surrounds the at least one first gas passage and has the radially inner thread;
   at least one second gas passage extending axially through the housing cover into an interior of the housing, the at least one second gas passage is disposed radially outward from the at least one first gas passage and radially outwardly from the annular web portion of the housing cover;
   at least one fluid outlet for fluid separated from the gas arranged at a radially outer side of the annular web portion and spaced apart from the at least one first gas passage by the annular web portion, at least one fluid outlet disposed with regard to the assembly axis radially between the at least one first gas passage and the at least one second gas passage;

a fluid outlet sealing device having at least one housing-side fluid outlet sealing part (66; 166) provided on the housing cover (28) on an axial outside of the housing cover (28) facing away from the interior of the housing, wherein the at least one housing-side fluid outlet sealing part (66; 166) is disposed between the at least one second gas passage (52) and the at least one fluid outlet opening (64).

8. A separating device for separating at least one fluid from a gas, comprising a housing having an assembly axis extending longitudinally through the housing, a first axial end of the housing configured to replaceably mount onto a connecting device having a tubular connecting part (16) forming a tubular connection nipple (16) having an outer thread;

wherein the housing at an first axial end includes a housing cover, the housing cover (28) includes:

at least one first gas passage extending axially through an annular web portion of the housing cover into an interior of the housing, the at least one first gas passage arranged centrally on the assembly axis of the housing and connecting to the connecting device, said gas passage (82) comprising a central, coaxial assembly opening (42) having a radially inner thread (44) configured and adapted to threadably engage with the outer thread on a radially outer side of the tubular connection nipple (16);

wherein the annular web portion of the housing cover surrounds the at least one first gas passage and has the radially inner thread for connecting to the connecting device;

at least one second gas passage extending axially through the housing cover into an interior of the housing, the at least one second gas passage is disposed radially outward from the at least one first gas passage and radially outwardly from the annular web portion of the housing cover;

at least one fluid outlet opening for fluid separated from the gas arranged at a radially outer side of the annular web portion and spaced apart from the at least one first gas passage by the annular web portion, at least one fluid outlet disposed with regard to the assembly axis radially between the at least one first gas passage and the at least one second gas passage;

a fluid outlet sealing device having at least one housing-side fluid outlet sealing part (66; 166) provided on the housing cover (28) on an axial outside of the housing cover (28) facing away from the interior of the housing, wherein the at least one housing-side fluid outlet sealing part (66; 166) is disposed between the at least one second gas passage (52) and the at least one fluid outlet opening (64);

wherein the at least one fluid outlet sealing device sealingly interacts in a radial direction with at least one corresponding connection-side fluid outlet sealing part of the tubular connecting part, which is provided for connecting the housing with the connection device.

9. The separating device according to claim 8, wherein the fluid outlet sealing device is secured onto an axially outer surface of the housing cover and forming a continuation of the at least one first gas passage, the fluid outlet sealing device including:

a support part as a hollow cylindrical body arranged centrally on the assembly axis of the housing and centrally aligned with the at least one first gas passage, the hollow cylindrical body having:

a coaxial ring arranged on a first axial end of the hollow cylindrical body and projecting radially outwardly from an outer circumferential surface of the hollow cylindrical body, the coaxial ring contacting against the axially outer surface of the housing cover; and at least one at least one housing-side fluid outlet sealing part, each as a radially outwardly projecting elastic seal lip formed on a circumferential outer surface of the hollow cylindrical body and surrounding the hollow cylindrical body.

* * * * *